United States Patent
Luebke et al.

(10) Patent No.: US 11,700,845 B2
(45) Date of Patent: Jul. 18, 2023

(54) BOOM BREAKAWAY HINGE ASSEMBLY WITH DAMPER SYSTEM

(71) Applicant: CNH Industrial America LLC, New Holland, PA (US)

(72) Inventors: Karl Luebke, New Holstein, WI (US); Derrick Fallon, Manitowoc, WI (US); Brian Pilney, Westbend, WI (US); Lyle P. Mangen, Willmar, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 808 days.

(21) Appl. No.: 16/675,518

(22) Filed: Nov. 6, 2019

(65) Prior Publication Data
US 2021/0127658 A1   May 6, 2021

(51) Int. Cl.
*A01M 7/00* (2006.01)
*F16C 11/04* (2006.01)

(52) U.S. Cl.
CPC ........ *A01M 7/0078* (2013.01); *A01M 7/0053* (2013.01); *F16C 11/04* (2013.01); *Y10T 403/32541* (2015.01); *Y10T 403/32614* (2015.01); *Y10T 403/32942* (2015.01)

(58) Field of Classification Search
CPC .............. A01M 7/0078; A01M 7/0053; A01M 7/0075; A01M 7/0082; Y10T 403/32541; Y10T 403/32614; Y10T 403/32942; F16C 11/04
See application file for complete search history.

(56) References Cited

U.S. PATENT DOCUMENTS

| 3,447,750 | A | | 6/1969 | Weston | |
|---|---|---|---|---|---|
| 4,200,255 | A | * | 4/1980 | Schmidt | A01M 7/0078 403/160 |
| 4,427,154 | A | | 1/1984 | Mercil | |
| 5,957,383 | A | | 9/1999 | Benest | |
| 6,027,039 | A | * | 2/2000 | Mercil | A01M 7/0075 239/161 |
| 7,076,834 | B2 | * | 7/2006 | Li | F16F 7/09 16/86 A |

(Continued)

FOREIGN PATENT DOCUMENTS

| GB | 2107162 A | * | 4/1983 | .......... A01M 7/0078 |
|---|---|---|---|---|
| WO | 2018141549 | | 8/2018 | |

*Primary Examiner* — Matthew R McMahon
(74) *Attorney, Agent, or Firm* — Rebecca Henkel; Rickard Demille (57) ABSTRACT

A breakaway hinge assembly includes a first bracket coupled to a boom section, a second bracket coupled to a breakaway boom section, and a damper system. The damper system includes a first damper assembly coupled to a stop bracket of the first bracket and a second damper assembly coupled to an upper bracket arm of the first bracket. Each damper assembly includes a housing, at least one rubber element disposed within the housing, a plunger having a first end in contact with the at least one rubber element, and a stop coupled to a second end of the plunger. The first and second brackets are pivotably coupled to each other so that the breakaway boom section pivots between a first position and a second position. The damper system is configured to prevent over-pivoting and reduce impact load of the breakaway boom section when pivoting to the first and second positions.

20 Claims, 4 Drawing Sheets

(56) References Cited

U.S. PATENT DOCUMENTS

| | | | |
|---|---|---|---|
| 7,249,448 B2 | 7/2007 | Murphy et al. | |
| 7,364,096 B1 * | 4/2008 | Sosnowski | A01M 7/0075 |
| | | | 239/168 |
| 7,377,453 B2 | 5/2008 | Auer et al. | |
| 8,413,298 B2 | 4/2013 | Domenig et al. | |
| 8,464,967 B2 | 6/2013 | Kuphal et al. | |
| 8,601,644 B1 | 12/2013 | Chen et al. | |
| 9,010,659 B2 | 4/2015 | Bouten | |
| 9,151,101 B2 | 10/2015 | Lowe | |
| 9,265,243 B2 * | 2/2016 | Kuphal | A01C 7/08 |
| 9,353,565 B2 * | 5/2016 | Bacchetti | E05F 3/104 |
| 9,408,379 B2 | 8/2016 | Kuphal | |
| 9,848,592 B2 * | 12/2017 | Peters | A01M 7/0071 |
| 10,188,092 B2 * | 1/2019 | Pilney | A01M 7/0082 |
| 10,194,648 B2 | 2/2019 | Hiddema et al. | |
| 10,212,927 B2 | 2/2019 | Bouten | |
| 10,221,597 B2 * | 3/2019 | Hammerer | E05D 3/142 |
| 10,323,683 B2 * | 6/2019 | Tortorella | F16C 11/12 |
| 11,224,211 B2 * | 1/2022 | Pilney | B05B 1/20 |
| 2010/0219264 A1 * | 9/2010 | Meyer | A01M 7/0053 |
| | | | 239/164 |
| 2016/0038961 A1 * | 2/2016 | Carlson | A01M 7/0075 |
| | | | 239/168 |
| 2016/0316737 A1 * | 11/2016 | Pilney | A01M 7/0053 |

\* cited by examiner

FIG. 5

BOOM BREAKAWAY HINGE ASSEMBLY WITH DAMPER SYSTEM

FIELD OF THE INVENTION

The invention relates generally to a damper system for an agricultural sprayer, and, more particularly, a damper system for a breakaway hinge assembly of an agricultural sprayer.

BACKGROUND OF THE INVENTION

As spray booms advance over time, the boom is made up of multiple sections connected to each other at a breakaway joint. The outer boom section is allowed to break away from the other larger section in order to fully extend the boom. To reduce impact loads at the joints between boom sections, a mechanism is used to reduce the force.

There are many different kinds of mechanisms used to reduce the impact loads. Examples includes a rubber stop, shock absorbers, gas dampers, and springs. Most of these different mechanisms require attachment to both boom sections on either side of the joint. As a result, these mechanisms limit the amount of travel and increase the stress at the mounted connection point on each boom section. In addition, these mechanisms add resistance and stored energy as one of the boom sections rotates, which can add to the load. Further yet, the components of these mechanisms can be very expensive and heavy, resulting in further loads on the boom.

SUMMARY OF THE INVENTION

According to an aspect of the invention, a boom breakaway hinge assembly includes a first bracket coupled to a boom section, a second bracket couple to a breakaway boom section, and a damper system having a damper assembly coupled to a stop bracket of the first bracket. The damper assembly includes a housing with a first end, a second end, and a cavity formed in the second end thereof and extended toward the first end thereof. At least one compression element is disposed within the cavity of the housing. Further, a plunger having a first end and a second end, the first end of the plunger is disposed within the cavity of the housing in order to be in contact with the at least one compression element. The damper assembly also includes a stop coupled to a second end of the plunger. The first and second brackets are pivotably coupled to each other via a pivot hinge along a pivot axis. The breakaway boom section pivots about the pivot axis between an extended position and a stored position. The damper assembly is configured to prevent over-pivoting and reduce load impact of the breakaway boom section when pivoting to the extended position.

In accordance with another aspect of the invention, the stop of the damper assembly is configured to interact with the second bracket to prevent over-pivoting of the breakaway boom section when pivoting to the extended position. Further, the stop of the damper assembly is configured to elastically deform upon impact with the second bracket to reduce load impact of the breakaway boom section when pivoting to the extended position. Further yet, the stop of the damper assembly exerts a force on the plunger of the damper assembly, which exerts a force on the at least one compression element of the plunger assembly upon impact of the stop with the second bracket. In turn, the at least one compression element is configured to elastically deform in response to the force exerted by the plunger to reduce load impact of the breakaway boom section when pivoting to the extended position.

In accordance with yet another aspect of the invention, the damper assembly is coupled to a mounting plate of the stop bracket via a fastener. Additionally, the fastener extends through an orifice of the stop plate, through an orifice in the first end of the housing, through an orifice in the at least one compression element, and into an orifice formed in the first end of the plunger. Further yet, the stop may include an interfit element extending from a first end thereof and into an orifice formed in the second end of the plunger.

According to another aspect of the invention, a boom breakaway hinge assembly includes a first bracket coupled to a boom section, a second bracket couple to a breakaway boom section, and a damper system including a damper assembly coupled to an upper bracket arm of the first bracket. The damper assembly includes a housing with a first end, a second end, and a cavity formed in the second end thereof and extended toward the first end thereof. At least one compression element is disposed within the cavity of the housing. Further, a plunger having a first end and a second end, the first end of the plunger is disposed within the cavity of the housing in order to be in contact with the at least one compression element. The damper assembly also includes a stop coupled to a second end of the plunger. The first and second brackets are pivotably coupled to each other via a pivot hinge along a pivot axis. In turn, the breakaway boom section pivots about the pivot axis between an extended position and a stored position. The damper assembly is configured to prevent over-pivoting and reduce load impact of the breakaway boom section when pivoting to the stored position.

In accordance with another aspect of the invention, the stop of the damper assembly is configured to interact with the stop plate to prevent over-pivoting of the breakaway boom section when pivoting to the stored position. Further, the stop of the damper assembly is configured to elastically deform upon impact with the stop plate to reduce load impact of the breakaway boom section when pivoting to the stored position. Further yet, the stop of the damper assembly exerts a force on the plunger of the damper assembly, which exerts a force on the at least one compression element of the plunger assembly upon impact of the stop with the stop plate. The at least one compression element is configured to elastically deform in response to the force exerted by the plunger to reduce load impact of the breakaway boom section when pivoting to the stored position.

In accordance with yet another aspect of the invention, the damper assembly is coupled to a wall of the upper bracket arm via a fastener. In addition, the fastener extends through an orifice of the stop plate, through an orifice in the first end of the housing, through an orifice in the at least one compression element, and into an orifice formed in the first end of the plunger.

In accordance with another aspect of the invention, the second bracket further includes a support plate extending from outward therefrom. The stop plate is configured to extend upward from the support plate.

According to yet another aspect of the invention, a breakaway hinge assembly includes a first bracket coupled to a boom section, a second bracket couple to a breakaway boom section, and a damper system having a first damper assembly and a second damper assembly. The first damper assembly is coupled to a stop bracket of the first bracket, and the second damper assembly is coupled to an upper bracket arm of the first bracket. Each damper assembly includes a housing having a cavity formed therein, at least one rubber element disposed within the cavity of the housing, a plunger having a first end and a second end, and a stop coupled to the second end of the plunger. The first end of the plunger is disposed within the cavity of the housing and in contact with the at least one rubber element, while the second end of the plunger being disposed outside the cavity of the housing, wherein the first and second brackets are pivotably coupled to each other via a pivot hinge along a pivot axis. The breakaway boom section pivots about the pivot axis between a first position and a second position. The first damper assembly is configured to prevent over-pivoting and reduce load impact of the breakaway boom section when pivoting to the first position. Meanwhile, the second damper assembly is configured to prevent over-pivoting and reduce load impact of the breakaway boom section when pivoting to the second position.

In accordance with another aspect of the invention, the stop of the first damper assembly is configured to interact with the second bracket to prevent over-pivoting of the breakaway boom section when pivoting to the first position. Meanwhile, the stop of the second damper assembly is configured to interact with the stop plate of the second bracket to prevent over-pivoting of the breakaway boom section when pivoting to the second position. The stop and at least one rubber element of the first damper assembly is configured to elastically deform in response to the impact of the stop with the second bracket to reduce load impact of the breakaway boom section when pivoting to the first position. Similarly, the stop and at least one rubber element of the second damper assembly is configured to elastically deform in response to the impact of the stop with the stop plate to reduce load impact of the breakaway boom section when pivoting to the second position.

In accordance with yet another aspect of the invention, the first damper assembly is coupled to the stop plate via a fastener that extends through a first end of the housing, through the at least one rubber element, and into the first end of the plunger. Likewise, the second damper assembly is coupled to a wall of the upper bracket via a fastener that extends through a first end of the housing, through the at least one rubber element, and into the first end of the plunger. The stop of each damper assembly includes an interfit element extending from a first end thereof and into an orifice formed in the second end of the plunger.

In accordance with another aspect of the invention, the second bracket further includes a support plate extending from outward therefrom. The stop plate is configured to extend upward from the support plate.

These and other aspects and features of the present invention will be more fully understood from the following detailed description and the enclosed drawings.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Figure 1:
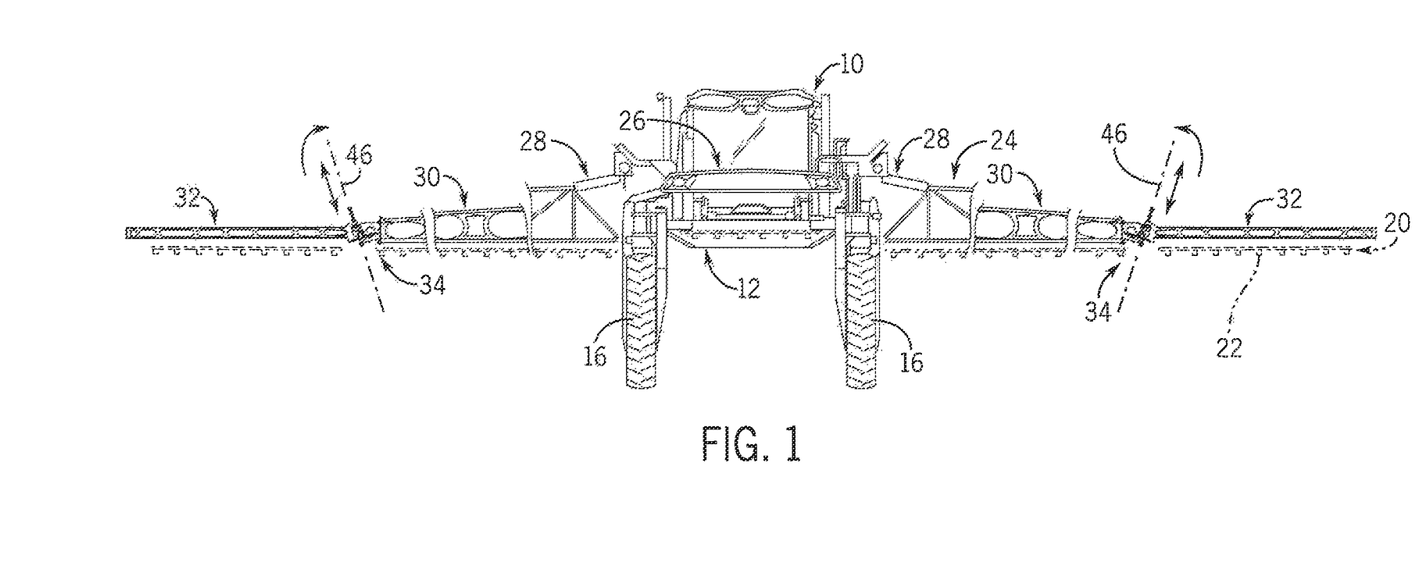
FIG. 1 is a front elevation view of an agricultural sprayer having a spray boom including a breakaway joint and a damper system.

Referring now to the drawings and specifically to FIG. 1, aspects of the invention are shown for use with an agricultural machine 10, for example, but not limited to, an agricultural sprayer. The agricultural machine 10 shown in FIG. 1 is a self-propelled agricultural sprayer vehicle or self-propelled sprayer 10, shown here as a front-boom sprayer. Although sprayer 10 is shown as a front-boom self-propelled sprayer, it is understood that the sprayer 10 may instead be configured as a rear-boom sprayer.

Still referring to FIG. 1, the sprayer 10 includes a chassis 12 having a chassis frame that supports various assemblies, systems, and components. These various assemblies, systems, and components can include an operator cab, an engine, and a hydraulic system. The hydraulic system receives power from the engine and includes at least one hydraulic pump which can be in a hydrostat arrangement for providing hydraulic pressure for operating hydraulic components within the hydraulic system. For sprayers with hydrostatic drives, hydraulic motors are operably connected to the hydraulic pump(s) for rotating the wheels 16. In mechanical drive applications, a mechanical transmission receives power from the engine and delivers power for rotating the wheels 16 by way of power-transmitting driveline components such as drive shafts, differentials, and other gear sets in portal, drop boxes, or other housings. A spray system can include storage containers such as a product tank for storing a volume of product for delivery onto an agricultural field with the sprayer 10. A product delivery pump can convey product from the product tank through plumbing components such as interconnected pieces of tubing and through a boom tubing system 20 for release out of spray nozzles 22 that are spaced from each other along the width of boom 24 during spraying operations of the sprayer 10. Groups or banks of multiple adjacent spray nozzles 22 define multiple spray sections of the spray system. Spray sections are defined along the boom 24 and selectively deliver product for release onto an agricultural field at locations corresponding to positions of activated spray sections. The boom 24 is connected to the chassis 12 with the lift arm assembly 26 that is configured to manipulate the boom 24 in a variety of directions to the application of the product.

As further shown in FIG. 1, each boom 24 includes a number of sections. In the representative embodiment of the invention, the boom 24 includes a primary boom section 28, a secondary boom section 30, and a breakaway boom section 32. In other embodiments of the invention, the boom 24 may include more or less than two (2) sections. Inner ends of the primary boom section 28 for each boom 24 are coupled to the lift arm assembly 26. Hinge joints connect the outer ends of the primary boom sections 28 with the inner ends of the secondary boom sections 30. Breakaway joints 34 interconnect the outer ends of the secondary boom sections 30 with the inner ends of the breakaway boom sections 32. Each breakaway joint 34 is configured to lock the breakaway boom sections 32 in a stable extended position, for example, with the breakaway boom section 32 extending linearly from the secondary boom section 30.

Figure 2:
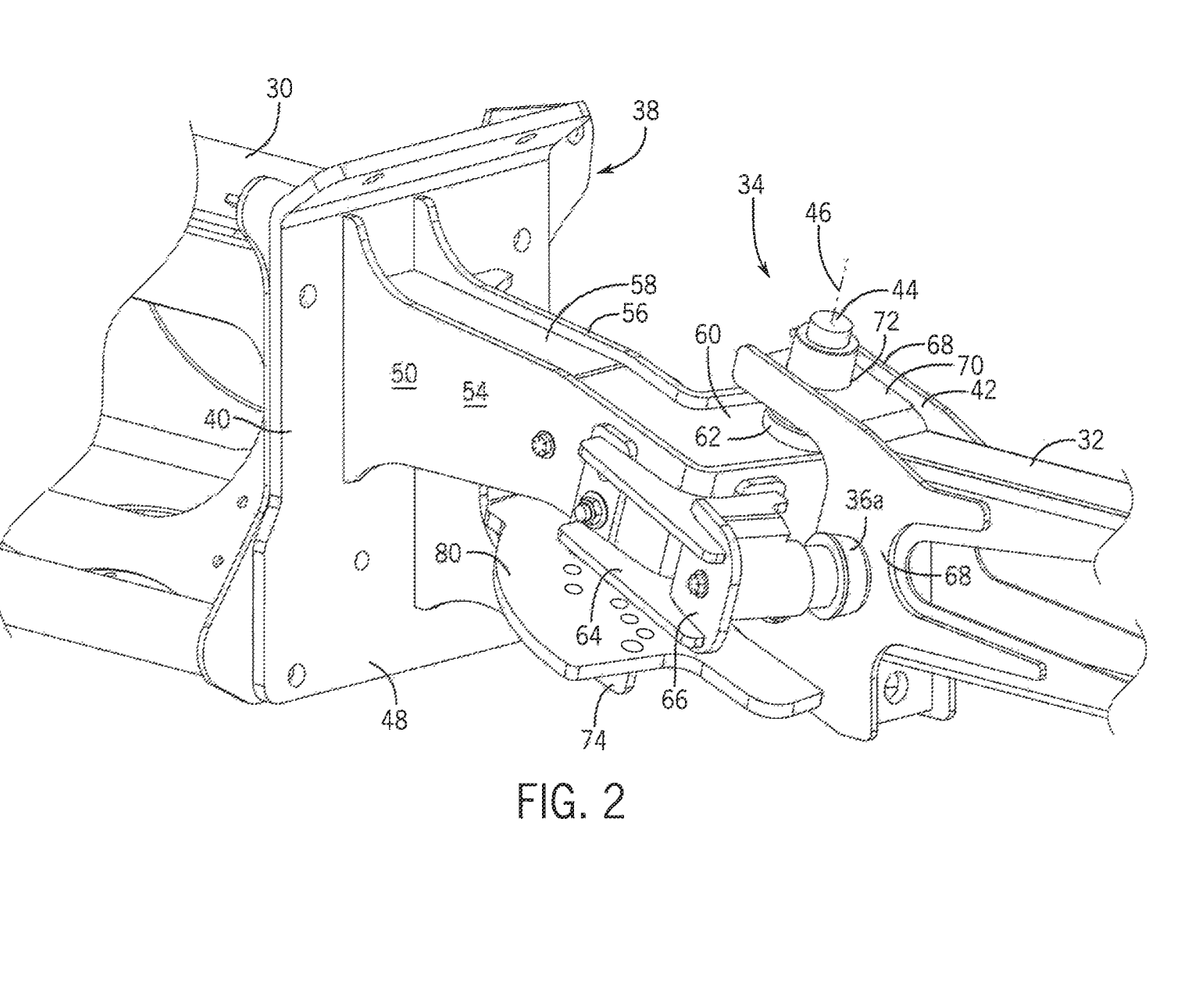
FIG. 2 is an enlarged perspective view of the breakaway joint and the damper system of FIG. 1.
Figure 3:
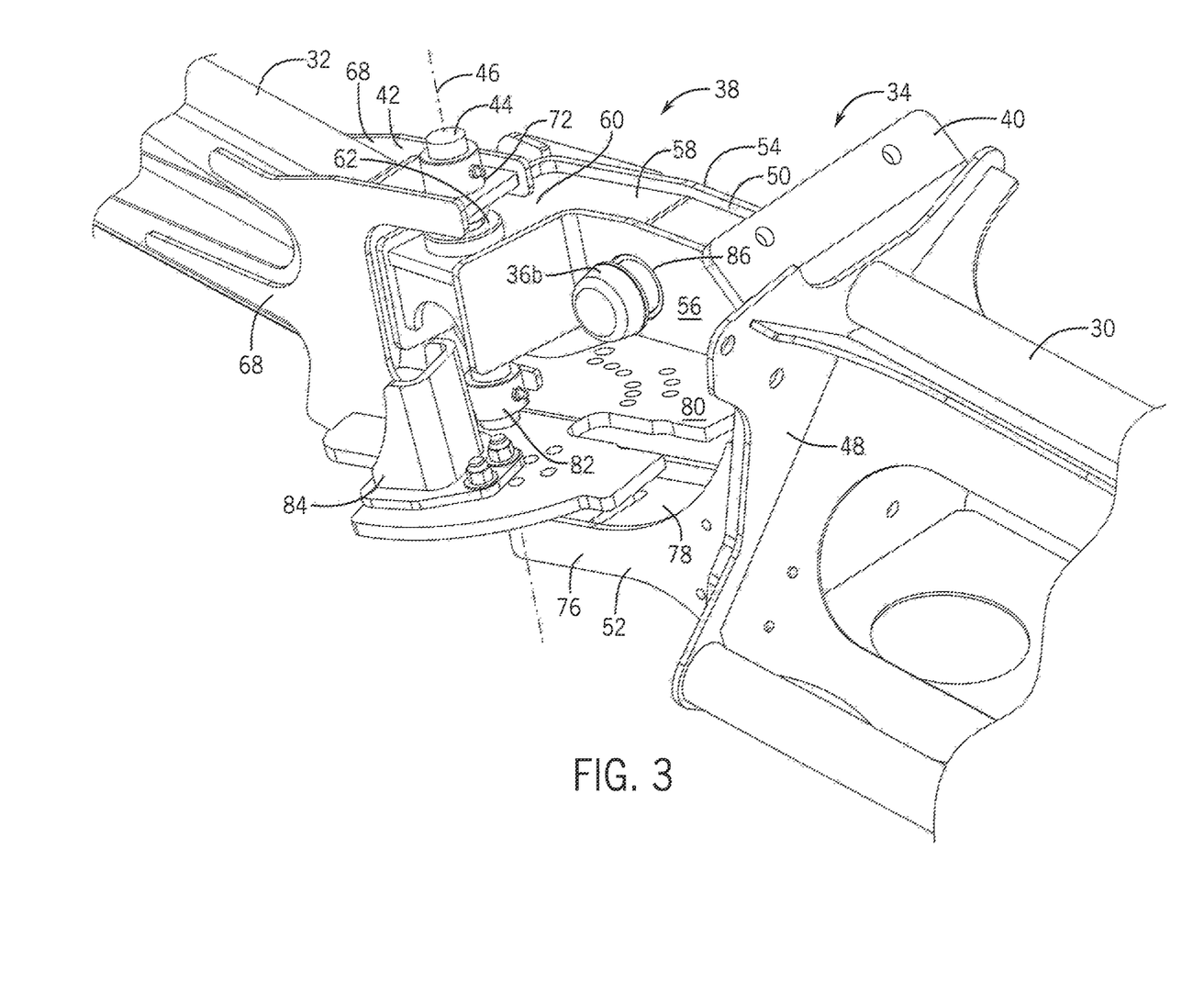
FIG. 3 is another enlarged perspective view of the breakaway joint and the damper system of FIG. 1.

Referring next to FIGS. 2 and 3, an enlarged perspective views are shown of one of the breakaway joint 34 of the boom 24. As shown, a damper system 36 is disposed at the joint 34. The breakaway joint 34 includes a hinge assembly 38 that guides movement of the breakaway boom section 32. The hinge assembly 38 includes an inner bracket 40 connected to the outer end of the secondary boom section 30 and an outer bracket 42 connected to the inner end of the breakaway boom section 32. A hinge pin 44 connects the inner and outer brackets 40, 42 to each other and defines a pivot axis 46 about which the breakaway boom section 32 pivots.

The inner bracket 40 is shown as a weldment that includes back plate 48. The back plate 48 is coupled to the outer end of the secondary boom section 30. Upper and lower bracket arms 50, 52 extend perpendicularly from the back plate 48. In the representative embodiment of the invention, the upper and lower bracket arms 50, 52 are offset with respect to each other, as the upper bracket arm 50 extends outwardly farther than the lower bracket arm 52. Each of the upper and lower bracket arms 50, 52 are shown formed with multiple webs of material that are attached to each other.

The upper bracket arm 50 includes an outer wall 54 and an inner wall 56. The outer and inner walls 54, 56 are connected to each other by way of a transverse shelf 58. In the representative embodiment of the invention, the inner wall 56 extends further down than the outer wall 54 and to a lower portion of the back plate 48. The upper bracket arm 50 defines an L-shaped configuration when viewed from above, with an outer segment 60 that extends angularly from the remainder of the upper bracket arm 50. The hinge pin 44 extends through a bore 62 formed in the outer segment 60 of the upper bracket arm 50.

The damper system 36 includes a first damper assembly 36*a* coupled to a stop bracket 64. The stop bracket 64 is attached to the outer wall 54 of the upper bracket arm 50. In the representative embodiment of the invention, the stop bracket 64 is configured to attach to the outer wall 54 of the upper bracket arm 50 at locations before and after the angular extension of the outer segment 60. The stop bracket 64 includes a mounting plate 66 oriented generally perpendicular to the outer segment 60 of the upper bracket arm 50. The first damper assembly 36*a* is coupled to the mounting plate 66 of the stop bracket 64. As shown in FIG. 2, the first damper assembly 36*a* is oriented generally parallel to the outer segment 60 of the upper bracket arm 50 and is cantilevered from the mounting plate 66. The first damper assembly 36*a* is configured to prevent travel of the breakaway boom section 32 in its forward direction beyond the stable extended position. The first damper assembly 36*a* engages the outer bracket 42 and/or the breakaway boom section 32 at the stable extended position and prevents over pivoting of the breakaway boom section 32.

The inner wall 56 of the upper bracket arm 50 is generally C-shaped in profile and defines an inner wall 74 of the lower bracket arm 52. An outer wall 76 of the lower bracket arm 52 is spaced from the inner wall 74 and connected thereto via a transverse shelf 78. A lower end of the hinge pin 44 extends through a bore formed in the shelf 78.

Still referring to FIGS. 2 and 3, the outer bracket 42 is a weldment that includes a pair of spaced apart walls 68 that are connected to each other with a transverse shelf 70. Each wall 68 has a side that is generally C-shaped facing toward the inner bracket 40. Each wall 68 further includes fingers extending therefrom in an opposite direction of the C-shaped side and are connected to the inner end of the breakaway boom section 32. Toward the top of the outer bracket 42, the hinge pin 46 extends through a bore 72 of the shelf 70. The outer bracket 42 also includes a support plate 80 disposed at a bottom end thereof. The support plate 80 is configured to extending outward from the outer bracket 42 and includes a bore 82 formed therein to receive the hinge pin 46. That is, the bores 62, 72, 82 described above in the brackets 50, 52 are aligned with each other so as to receive the hinge pin 46.

A stop plate 84 is coupled to and extends upward from the support plate 80 so as to provide a backstop to interact with a second damper assembly 36*b* to prevent the breakaway boom section 32 from over pivoting when returning to a stored position. The second damper assembly 36*b* is disposed within the upper bracket arm 50 of the inner bracket 40 and extends through an orifice 86 formed in the inner wall 56 of the upper bracket arm 50. As shown in FIG. 3, the second damper assembly 36*b* is oriented generally perpendicular to the inner wall 56 of the upper bracket arm 50 as it extends outward thorough the orifice 86. The second damper assembly 36*b* is configured to prevent travel of the breakaway boom section 32 in its reverse direction beyond the stored position by engaging the outer bracket 42 and/or the breakaway boom section 32 at the stored position and preventing over pivoting of the breakaway boom section 32.

Figure 4:
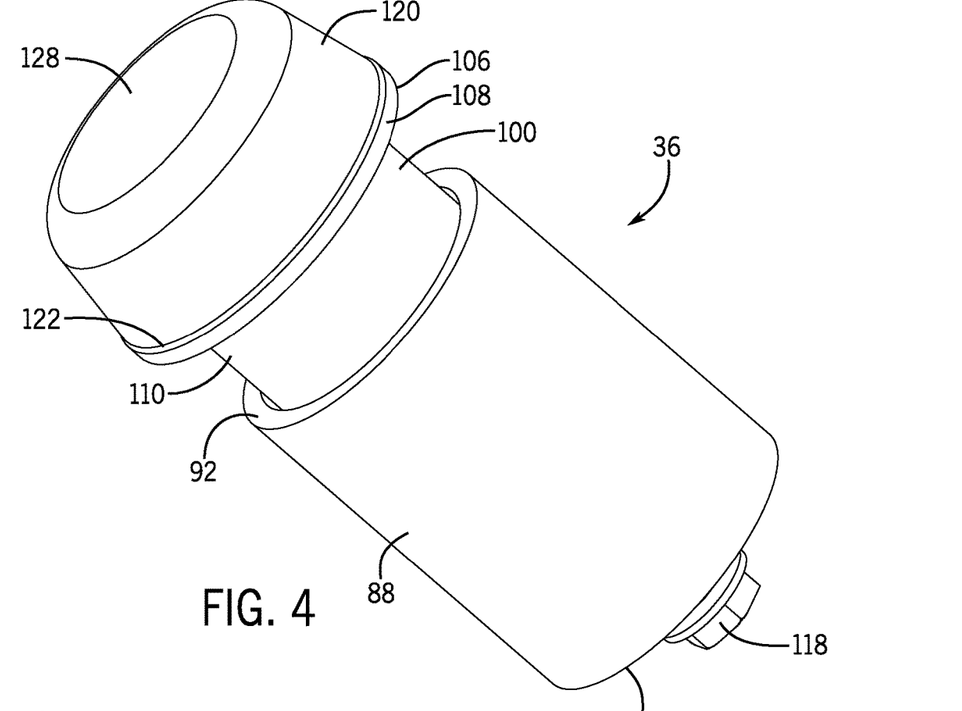
FIG. 4 is a perspective view of a damper assembly of the damper system.

Next, FIG. 4 depicts a perspective view of a damper assembly 36. While the representative embodiment of the invention includes first and second damper assemblies 36*a*, 36*b*, other embodiments of the invention may use any number of damper assemblies 36 to assist in transitioning the breakaway boom section 42 between the stored position and the extended position. Each damper assembly 36 includes a housing 88 having a first end 90 and a second end 92. The housing 88 further includes a cavity 94 formed in the second end 92 thereof and extending toward the first end 90 thereof. One or more rubber compression elements 96, such as rubber disks, are disposed within the cavity 94 adjacent the first end 90 of the housing 88. That is, a first end 98 of the rubber disk 96 is at or proximate to the first end 90 of the housing 88.

A plunger 100 is partially disposed within the cavity 94 so that a first end 102 of the plunger 100 is in contact with a second end 104 of the one or more rubber disks 96. Meanwhile, a second end 106 of the plunger is disposed outside the cavity 94. In the representative embodiment of the invention, the second end 106 of the plunger 100 includes a rim 108 having a larger diameter than the main body 110 of the plunger 100. An orifice 112 is formed in the first end 102 of the plunger 100 and extend partially or completely through the plunger 100. Similarly, an orifice 114 is formed completely through the at least one compression element 96.

The first end 90 of the housing 88 may be coupled to a mounting plate 116 by way of a fastener 118. The fastener 118 is configured to extend through an orifice 120 formed in the mounting plate 116, through the orifice 114 formed in the one or more compression element 96, and into the orifice 112 formed in the plunger 100. In turn, the fastener 118 couples the housing 88, compression elements 96, plunger 100 and mounting plate 116 together. Referring again to FIG. 2, the first end 90 of the housing 88 of the first damper assembly 36*a* is coupled to a mounting plate 116 in the form of the mounting plate 66. Meanwhile in FIG. 3, the first end 90 of the housing 88 of the second damper assembly 36b is coupled to a mounting plate 116 in the form of outer wall 54 of the upper bracket arm 50.

Figure 5:
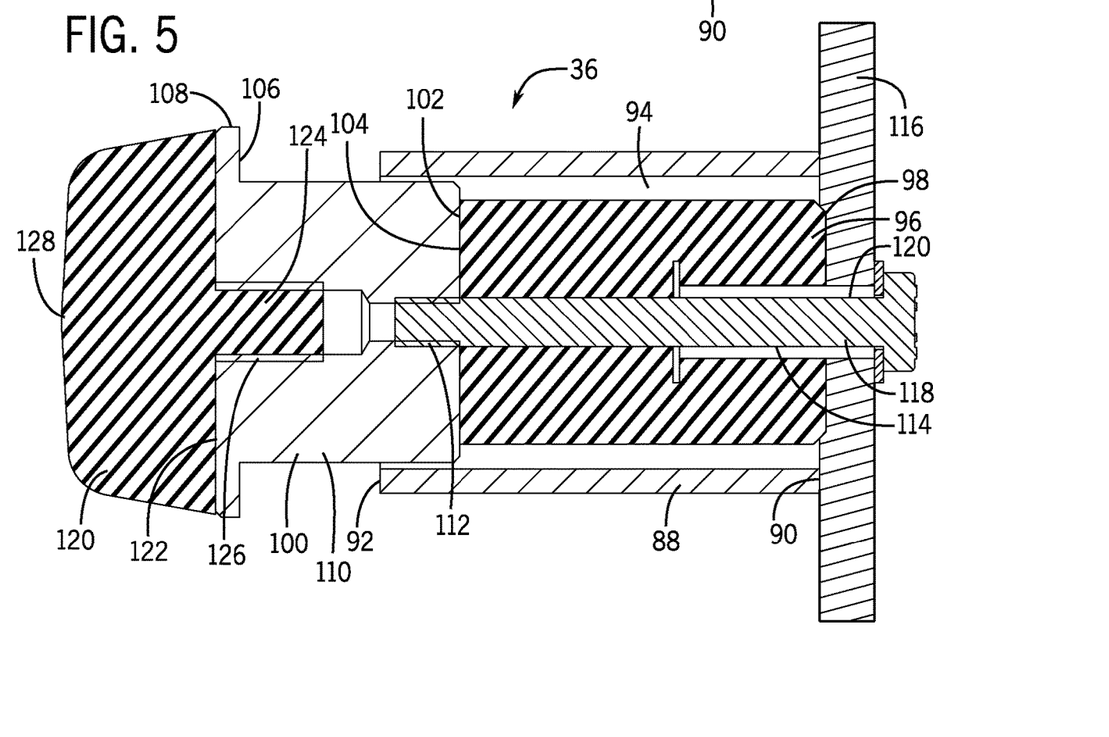
FIG. 5 is a cross-sectional view of the damper assembly of FIG. 4.

The damper assembly 36 further includes a stop 120 coupled to the second end 106 of the plunger 100. In the representative embodiment of the invention, a first end 122 of the stop 120 includes an interfit element 124 extending therefrom. In addition, the second end 106 of the plunger 100 includes an orifice 126 formed therein and extending partially therethrough. The orifice 126 is sized and configured to receive the interfit element 124 of the stop 120 to assist in coupling the stop 120 to the plunger 100. A second end 128 of the stop 120 is configured to interact with the wall 68 of the outer bracket 42 as described above to prevent over-pivoting of the breakaway boom section 32. The stop 120 comprises an elastic material, such as rubber, that is able to elastically deform on impact.

As described above, when the breakaway boom section 32 is transitioned from the stored position to the extended position, the first damper assembly 36a contacts the outer bracket 42 to prevent over-pivoting of the breakaway boom section 32. Conversely, when the breakaway boom section 32 is transitioned from the extended position to the stored position, the second damper assembly 36a contacts the outer bracket to prevent over-pivoting of the breakaway boom section 32. In addition, the damper assembly 36 helps reduced the impact load associated with the breakaway boom section 32 reaching the stored or extended position. That is, when the breakaway boom section 32 reaches the stored or extended position, there is an impact between the damper assembly 36 and the breakaway boom section 32. The above described design of the damper assembly 36 reduces the impact load by absorbing a portion of the impact force.

In both instances, it is the stop 120 of the damper assembly 36 that contacts the outer bracket 42. The damper assembly 36 is configured so that when the outer bracket 42 contacts the stop 120, the stop 120 is compressed to absorb a portion of the impact force. In turn, the remaining impact force causes the stop 120 to move the plunger 100 in a direction toward the compression elements 96. The compression elements 96 are then able to compress and absorb another portion of the impact force as they elastically deform. As a result, the impact force imparted from the outer bracket 42 to the inner bracket 40 is reduced.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A boom breakaway hinge assembly with a damper system, the boom breakaway hinge assembly comprising:
   a first bracket coupled to a boom section, the first bracket including a stop bracket coupled thereto;
   a second bracket coupled to a breakaway boom section;
   a damper system including a damper assembly coupled to the stop bracket, the damper assembly comprising:
      a housing having a first end, a second end, and a cavity formed in the second end thereof and extended toward the first end thereof;
      at least one rubber compression element disposed within the cavity of the housing;
      a plunger having a first end and a second end, the first end of the plunger being disposed within the cavity of the housing and in contact with the at least one rubber compression element, the second end of the plunger being disposed outside the cavity of the housing; and
      a stop coupled to the second end of the plunger;
   wherein the first and second brackets are pivotably coupled to each other via a pivot hinge along a pivot axis;
   wherein the breakaway boom section pivots about the pivot axis between an extended position and a stored position;
   wherein the damper assembly is configured to prevent over-pivoting and reduce load impact of the breakaway boom section when pivoting to the extended position.

2. The boom breakaway hinge assembly of claim 1 wherein the stop of the damper assembly is configured to interact with the second bracket to prevent over-pivoting of the breakaway boom section when pivoting to the extended position.

3. The boom breakaway hinge assembly of claim 2 wherein the stop of the damper assembly is configured to elastically deform upon impact with the second bracket to reduce load impact of the breakaway boom section when pivoting to the extended position.

4. The boom breakaway hinge assembly of claim 2 wherein the stop of the damper assembly exerts a force on the plunger of the damper assembly, which exerts a force on the at least one rubber compression element of the plunger assembly upon impact of the stop with the second bracket; and
   wherein the at least one rubber compression element is configured to elastically deform in response to the force exerted by the plunger to reduce load impact of the breakaway boom section when pivoting to the extended position.

5. The boom breakaway hinge assembly of claim 1 wherein the damper assembly is coupled to a mounting plate of the stop bracket via a fastener.

6. The boom breakaway hinge assembly of claim 5 wherein the fastener extends through an orifice of the stop plate, through an orifice in the first end of the housing, through an orifice in the at least one rubber compression element, and into an orifice formed in the first end of the plunger.

7. The boom breakaway hinge assembly of claim 1, wherein the first end of the plunger abuts against and contacts an adjacent end of the at least one rubber compression element when the breakaway boom section is in the extended position.

8. A boom breakaway hinge assembly with a damper system, the boom breakaway hinge assembly comprising:
   a first bracket coupled to a boom section;
   a second bracket coupled to a breakaway boom section, the second bracket including a stop plate coupled thereto;
   a damper system including a damper assembly coupled to an upper bracket arm of the first bracket, the damper assembly comprising:
      a housing having a first end, a second end, and a cavity formed in the second end thereof and extended toward the first end thereof;
      at least one rubber compression element disposed within the cavity of the housing;
      a plunger having a first end and a second end, the first end of the plunger being disposed within the cavity of the housing and in contact with the at least one rubber compression element, the second end of the plunger being disposed outside the cavity of the housing; and a stop coupled to the second end of the plunger;

wherein the first and second brackets are pivotably coupled to each other via a pivot hinge along a pivot axis;

wherein the breakaway boom section pivots about the pivot axis between an extended position and a stored position; and wherein the damper assembly is configured to prevent over-pivoting and reduce load impact of the breakaway boom section when pivoting to the stored position.

9. The breakaway hinge assembly of claim 8 wherein the stop of the damper assembly is configured to interact with the stop plate to prevent over-pivoting of the breakaway boom section when pivoting to the stored position.

10. The breakaway hinge assembly of claim 9 wherein the stop of the damper assembly is configured to elastically deform upon impact with the stop plate to reduce load impact of the breakaway boom section when pivoting to the stored position.

11. The breakaway hinge assembly of claim 9 wherein the stop of the damper assembly exerts a force on the plunger of the damper assembly, which exerts a force on the at least one rubber compression element of the plunger assembly upon impact of the stop with the stop plate; and wherein the at least one rubber compression element is configured to elastically deform in response to the force exerted by the plunger to reduce load impact of the breakaway boom section when pivoting to the stored position.

12. The breakaway hinge assembly of claim 8 wherein the damper assembly is coupled to a wall of the upper bracket arm via a fastener.

13. The breakaway hinge assembly of claim 12 wherein the fastener extends through an orifice of the wall, through an orifice in the first end of the housing, through an orifice in the at least one rubber compression element, and into an orifice formed in the first end of the plunger.

14. The breakaway hinge assembly of claim 8 wherein the second bracket further includes a support plate extending from outward therefrom; and wherein the stop plate is configured to extend upward from the support plate.

15. The boom breakaway hinge assembly of claim 8, wherein the first end of the plunger abuts against and contacts an adjacent end of the at least one rubber compression element when the breakaway boom section is in the extended position.

16. A breakaway hinge assembly with a damper system, the boom breakaway hinge assembly comprising:

a first bracket coupled to a boom section, the first bracket including a stop bracket coupled thereto;

a second bracket coupled to a breakaway boom section, the second bracket including a stop plate coupled thereto;

a damper system including a first damper assembly coupled to the stop bracket and a second damper assembly coupled to an upper bracket arm of the first bracket, each damper assembly comprising:

a housing having a cavity formed therein;

at least one rubber element disposed within the cavity of the housing;

a plunger having a first end and a second end, the first end of the plunger being disposed within the cavity of the housing and in contact with the at least one rubber element, the second end of the plunger being disposed outside the cavity of the housing; and a stop coupled to the second end of the plunger;

wherein the first and second brackets are pivotably coupled to each other via a pivot hinge along a pivot axis;

wherein the breakaway boom section pivots about the pivot axis between a first position and a second position;

wherein the first damper assembly is configured to prevent over-pivoting and reduce load impact of the breakaway boom section when pivoting to the first position; and wherein the second damper assembly is configured to prevent over-pivoting and reduce load impact of the breakaway boom section when pivoting to the second position.

17. The breakaway hinge assembly of claim 16 wherein the stop of the first damper assembly is configured to interact with the second bracket to prevent over-pivoting of the breakaway boom section when pivoting to the first position; and wherein the stop of the second damper assembly is configured to interact with the stop plate of the second bracket to prevent over-pivoting of the breakaway boom section when pivoting to the second position.

18. The breakaway hinge assembly of claim 17 wherein the stop and at least one rubber element of the first damper assembly is configured to elastically deform in response to the impact of the stop with the second bracket to reduce load impact of the breakaway boom section when pivoting to the first position; and wherein the stop and at least one rubber element of the second damper assembly is configured to elastically deform in response to the impact of the stop with the stop plate to reduce load impact of the breakaway boom section when pivoting to the second position.

19. The breakaway hinge assembly of claim 16 wherein the first damper assembly is coupled to the stop plate via a fastener that extends through a first end of the housing, through the at least one rubber element, and into the first end of the plunger; and wherein the second damper assembly is coupled to a wall of the upper bracket via a fastener that extends through a first end of the housing, through the at least one rubber element, and into the first end of the plunger.

20. The boom breakaway hinge assembly of claim 16, wherein the first end of the plunger abuts against and contacts an adjacent end of the at least one rubber element when the breakaway boom section is in the extended position.

* * * * *